United States Patent [19]

McGough

[11] Patent Number: 4,942,748
[45] Date of Patent: Jul. 24, 1990

[54] SECURITY MECHANISM FOR TELEPHONE PAYSTATIONS

[75] Inventor: Gerald B. McGough, Huntsville, Ala.

[73] Assignee: Palco Telecom Inc.; Nashville, Tenn.

[21] Appl. No.: 364,093

[22] Filed: Jun. 9, 1989

[51] Int. Cl.⁵ .............................................. E05B 11/00
[52] U.S. Cl. .............................. 70/389; 70/DIG. 72; 70/134; 379/445; 379/155; 379/451; 312/222
[58] Field of Search ................. 70/134, 389, DIG. 72; 379/440, 445, 451, 143, 145, 155, 435; 312/222, 229

[56] References Cited

U.S. PATENT DOCUMENTS

| | | | |
|---|---|---|---|
| 3,142,522 | 7/1964 | Hall et al. | 70/389 X |
| 3,213,210 | 10/1965 | Samples | 379/445 X |
| 3,258,535 | 6/1966 | Nawman | 379/155 |
| 3,317,674 | 5/1967 | Nawman | 379/435 X |
| 3,391,256 | 7/1968 | Nawman | 70/DIG. 72 X |
| 3,393,273 | 7/1968 | Bustos | 379/155 |
| 3,846,594 | 11/1974 | Morrell et al. | 379/451 |
| 3,868,483 | 2/1975 | Trimmer et al. | 379/445 X |
| 4,416,413 | 11/1983 | Chester | 70/389 X |
| 4,691,543 | 9/1987 | Watts | 70/134 X |
| 4,753,092 | 6/1988 | Mercer | 70/389 |

Primary Examiner—Robert L. Wolfe
Assistant Examiner—Suzanne L. Dino
Attorney, Agent, or Firm—Robert J. Black

[57] ABSTRACT

A security mechanism for use in a telephone paystation upper housing consisting of a specialized latching mechanism which operates when a non-legal key combination is utilized to gain access to a paystation upper housing to inhibit unlocking of the upper housing and to inhibit the removal of key utilized to gain access to the upper housing. The mechanism is available in kit form and may be added to existing paystations without major modification thereto.

8 Claims, 3 Drawing Sheets

SECURITY MECHANISM FOR TELEPHONE PAYSTATIONS

BACKGROUND OF THE INVENTION

1. Field of the Invention

The present invention pertains to telephone paystations and more particularly to a security mechanism effective to prevent access and to capture unauthorized keys when they are utilized to attempt to secure access to the telephone paystation upper housing assembly.

2. Background Art

A substantial portion of both the deregulated and regulated paystation industry utilize instruments having housings of the type that have been manufactured for many years by such organizations as AT&T, GTE, and Palco Telecom. It has been generally found that such housings include adequate security measures. However, in some locations telephone companies, or other users, have found that the security of the upper housings of telephone units have become a problem. Companies which have high investments in upper housings and "smart" circuit cards included in the housings are frequently victimized by break-ins. A strong desire exists on the part of such companies, or their users, to protect their investment in the telephone instrument as well as the coinage that may have been deposited in the telephone instruments, and of course the included technology in the telephone instrument.

The typical paystation construction consists of an upper and lower housing. This is to provide separate sections for coin collection and maintenance. Typically, maintenance personnel are given keys to the upper housing while coin collection personnel receive keys for use to gain access to the lower housing. In a typical telephone company operation, the upper housing units are usually keyed alike to facilitate entry by repair personnel. The lower housings are key coded individually for coin box security. Therefore, keys for the lower housing are generally tightly controlled by the coin collection department. Because many keys are issued to the upper housing, and misplaced keys are often replaced easily, their availability to persons other than those authorized is quite common. The upper housing access, in some cases, is not well controlled. As a result of this situation, problems resulting from unauthorized entry of the upper housing are frequently incurred. These problems include vandalism, pay telephone circuit manipulation, fraudulent unpaid calls, and loss of coins from the lower housing vault area occurred when they are fished out of the lower vault housing.

So called key grabber mechanisms were frequently employed in the old or three slot paystations in use throughout North America. These mechanisms contained a lock to effectively grap the key should it be inappropriate for access to the upper housing. The mechanism in this situation was a portion of the lock. Similar locks have not been employed in the single slot coin telephones now manufactured and which have become standard throughout the industry.

SUMMARY OF THE INVENTION

The security mechanism of the present invention is designed to improve upper housing security particularly relating to those problems existing where upper housing keys may fall into unauthorized hands. The included mechanism of the present invention can remove these keys from circulation while at the same time preventing their use to enter the upper housing illegally. It is also possible with a particular variation of the present invention to provide a non-key grabber arrangement which will provide only the security arrangement. It is intended that the devices of the present invention be provided in kit form for easy installation in the field with the requirement for no special tools.

With utilization of the present invention, access to the upper housing becomes restricted to those with both upper and lower housing keys, since the mechanism may then be unlocked from the lower housing by use of a special tool. No changes are required to the upper or lower housing locks when the present invention is employed. As taught in the present invention, a spring loaded latch rotates about a special nut. The latch includes a T-shaped slot engaging the special pin on the locking bar. For the locking bar pin to be free to move it must ride in the upper bar section of the T-shaped opening included in the latch mechanism. At approximatley one-half movement of the locking bar, the spring loaded latch rotates about a special nut so that the pin moves into the lower or handle portion of the "T", thus restricting further or return movement. It is in this position that the locking bar entraps the bolt from the upper housing lock and prevents its returning home. Without returning to home, the upper housing key cannot be removed and hence the term "key grabber".

To unlock the latch a special tool is inserted through the lower housing base after access has been gained by means of the lower housing key and engages a stud projecting at right angles from the latch thus rotating the latch so that the pin returns to the bar section of the T-shaped opening in the latch mechanism. Lower housing access obviously is limited to those with lower housing keys. Thus it will be obvious from the foregoing that both upper and lower housing keys are required to gain access to the upper housing. The mechanism of the present invention can be mounted to either left or right hand side of the upper housing by virtue of the stud being mountable or either side of the latch.

An alternative version of the latch mechanism of the present invention exists with an L-shaped slot which does not trap keys. In this arrangement it merely prevents movement of the locking bar initially. On an attempted illegal entry, the lock key could be freely rotated between unlocked and locked or home positions but the locking bar movement will still be prevented by the latch. The pin attached to the locking bar would be trapped in the one leg of the L-shaped opening in the latch. Again, to unlock the latch, the special tool would engage the latch as in the above described arrangement and rotated to the other leg of the "L".

DESCRIPTION OF THE PREFERRED EMBODIMENTS

Figure 1:
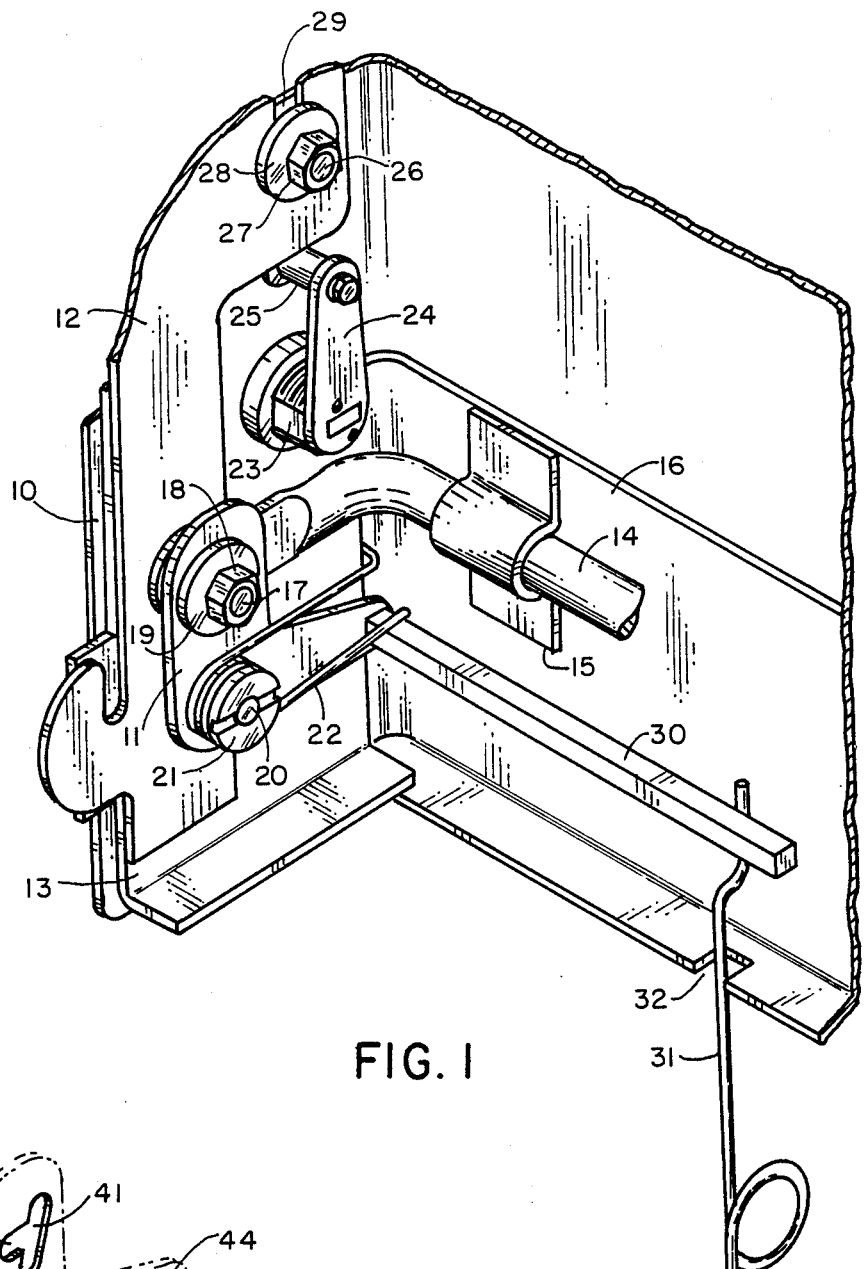
FIG. 1 is a partial perspective view of the interior of a telephone paystation upper housing including a paystation lock and a latching mechanism in accordance with the present invention.

Referring now to FIG. 1 of the present invention, a portion of the interior of a telephone paystation 10 is shown which contains the specialized latch 11 of the present invention which by means of bolt 20 and specialized nut 21 is secured to backing plate 13. Also affixed to nut 21 is spring 22 which at one end thereof is engaged by an edge of backing plate 13 and the other end of spring 22 which is utilized to engage stud 30 which is fastened at one end to latch 11.

Figure 2:
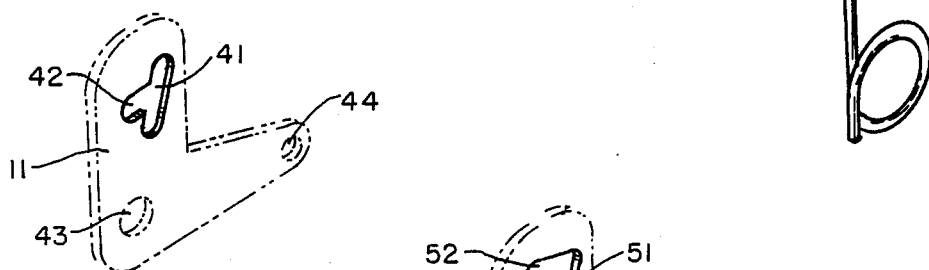
FIG. 2 is a perspective view of first form of the latch as utilized in the present invention.

As may be seen by reference to FIG. 2, latch 11 includes a T-shaped opening having a bridge portion 41 and a lower or base portion 42. Bolt 17 extends through one end of torsion bar 14, then through the T-shaped opening of latch 11, and is then secured by washer 19 and nut 18. Torsion bar 14 is secured by torsion bar mounting bracket 15 which is welded to the torsion bar bracket mounting plate 16. Paystation lock 23 is seen as viewed from the rear where it passes through the paystation wall 10 and bearing plate 13 and includes cam 24 attached to the rear of lock 23 with bolt 25 being attached to the opposite end from the lock, of cam 24. The bearing plate 13 is welded in place against the paystation housing wall 10. Bolt 20 and bolt 26 are secured to bearing plate 13. It may be seen that an elongated opening 29 is provided in locking bar 12 which allows movement of the locking bar in a vertical direction. A similar elongated opening also is included in the locking bar 12 in the area behind latch 11. These elongated openings, such as 29, and the one through which bolt 20 passes, facilitates the vertical movement of locking bar 12.

A special tool 31 useful in connection with the operation of the present invention is shown projecting through an opening 32 which extends between the lower vault of the paystation (not shown) and the upper portion. A portion of the special tool as can be seen in FIG. 1 engages stud 30 which is affixed at one end to latch 11.

Figure 4:
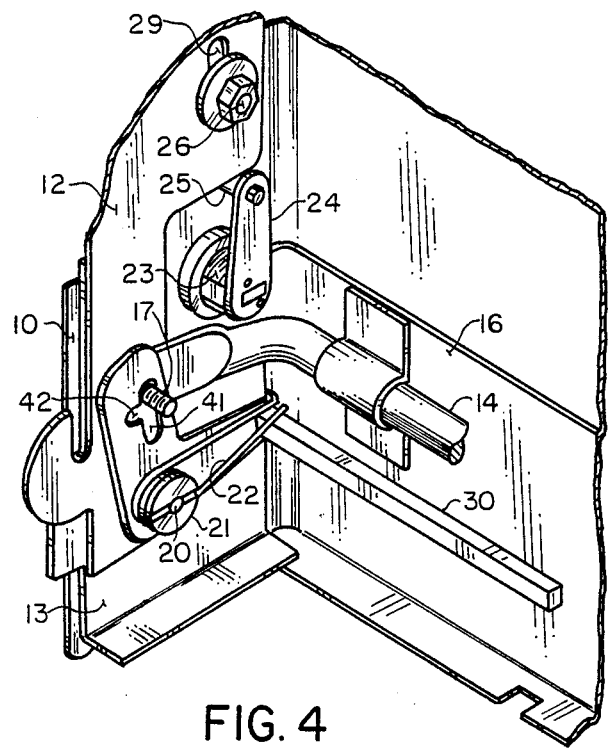
FIG. 4 is a partial perspective view of the interior of a telephone paystation upper housing including a paystation lock and showing the latching mechanism of the present invention in the locked position.
Figure 5:
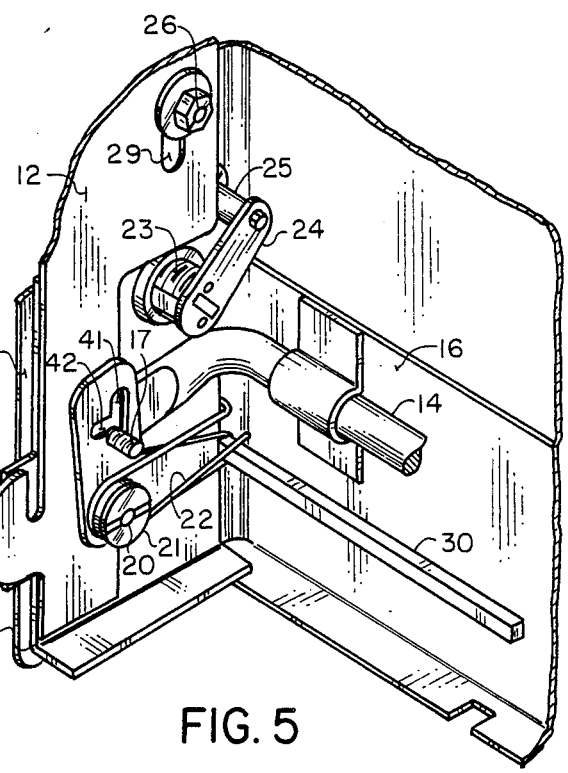
FIG. 5 is a partial perspective view of the interior of a telephone paystation upper housing including a paystation lock and showing the latching mechanism in the normal unlocked position.
Figure 6:
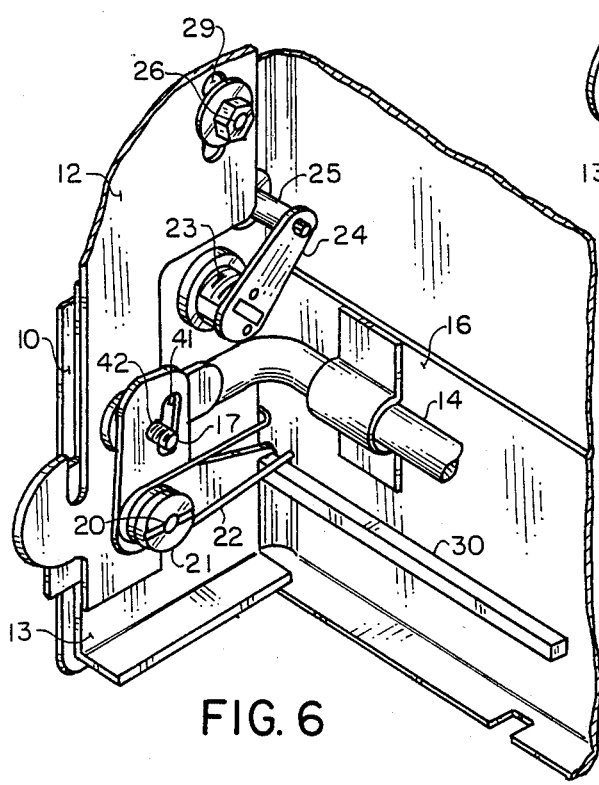
FIG. 6 is a partial perspective view of the interior of a telephone paystation upper housing including a paystation lock and showing the latching mechanism of the present invention in the trapper position.

FIGS. 4, 5 and 6 are similar to FIG. 1 in that they show the same portion of the interior of a telephone paystation 10 shown in FIG. 1 except that for purposes of clarification nut 18 and washer 19 associated with pin 17 have been removed to effectively show the various positions of pin 17 in the openings 41 and 42 of latch 11. Specifically, in FIG. 4, pin 17 is shown in the locked position with pin 17 in the upper portion of opening 41. FIG. 5 shows pin 17 located in the lower section of opening 41 of pin latch 11 which would be the appropriate position in the unlocked position.

FIG. 6 shows pin 17 located in opening 42 or the so-called trapped position as would be encountered when a key is inserted in lock 23 and access is attempted to be gained to the paystation housing.

Referring again to FIG. 1, the spring loaded latch 11 in operation rotates about special nut 21. The included T-shaped slot, consisting of sections 41 and 42 as may be seen by reference to FIG. 2 and also FIGS. 4, 5 and 6 engages pin 17 which extends from the locking bar 12. For locking bar pin 17 to be free to move it must ride in the upper or bar section 41 through the T-shaped opening of latch 11. A one-half movement in vertical direction of the locking bar 12 causes the spring loaded latch 11 to rotate about the special nut 21 in such a fashion that the pin 17 moves into the lower handle portion 42 of the T-shaped opening of latch 11 as seen in FIG. 6, and any further or return movement is restricted.

It is in this position that the locking bar 12 acts to trap bolt 25 from the upper housing lock 23 and prevent it returning to its home position. Without the ability to return to the home position, the upper housing key that has been placed into lock 23 cannot be removed and hence the term "key grabber".

To unlock the latch, special tool 31 is inserted through the lower housing base and engages stud 30 which is seen projecting at right angles from latch 11 and upon application of pressure in an upward direction causes the latch to rotate so that the pin 17 returns to the bar or upper section 41 of the T-shaped slot in latch 11 as maybe seen in FIG. 4.

Access to the lower housing is restricted to those employees who have lower housing keys. The mechanism as shown herein is adaptable to be mounted to either the left or right hand side of the upper housing by virtue of the stud being mountable on either side of the latch.

Figure 7:
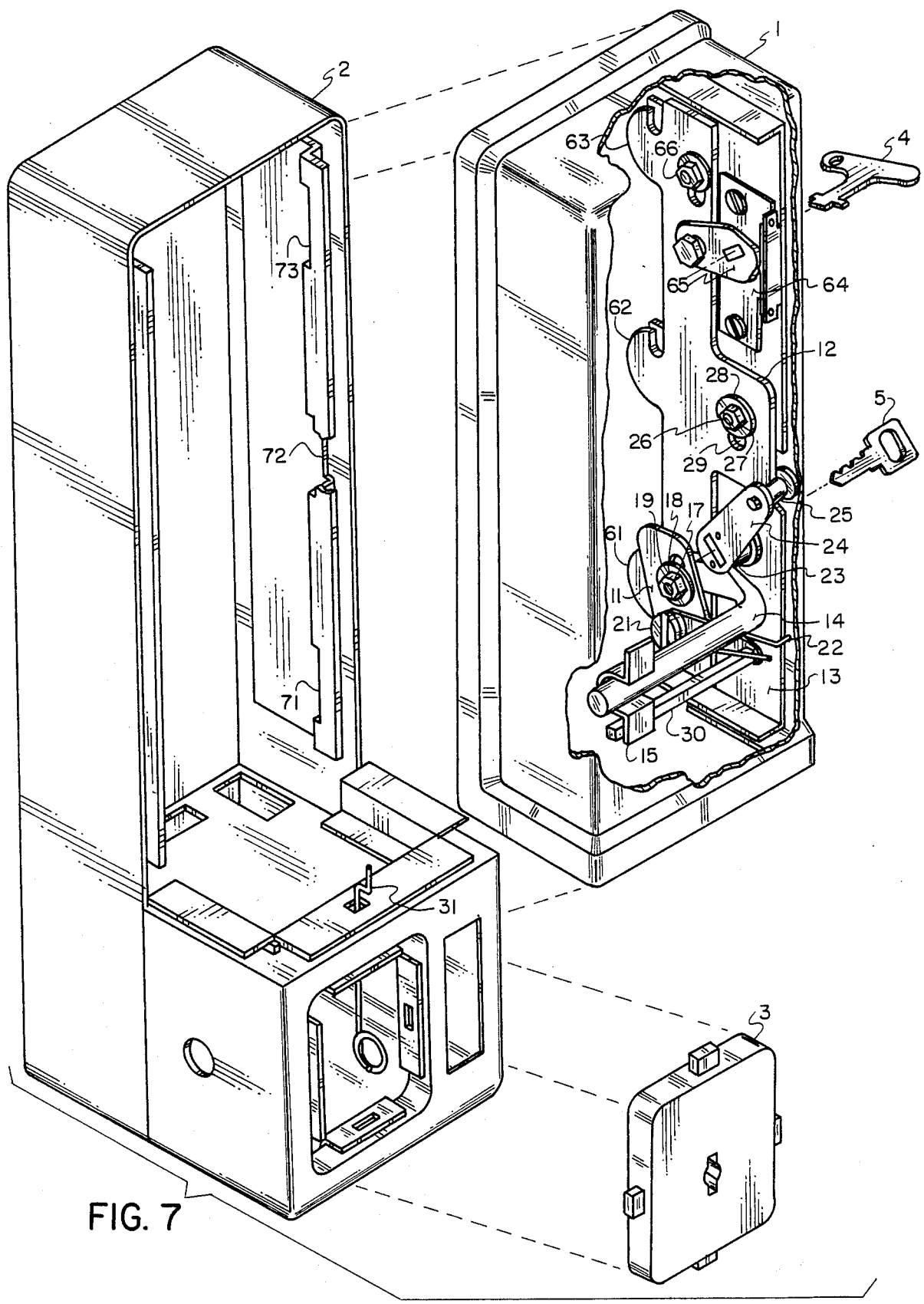
FIG. 7 is an exploded perspective view of a telephone paystation showing the lower housing and a break away view of the upper housing as well as a vault door associated with the lower housing.

As may be seen by reference to FIG. 7, after the latch has been unlocked, by insertion of special tool 31 from the lower housing (as may be seen in FIG. 7), latching bar 12 is free to move in a downward direction in response to insertion of tool 4 through the paystation housing 1 to engage actuator bar 65 which is attached to latching bar 12. With this motion, and the lock moved out of the way, the latching bar is free to move in a downward direction and ears 61, 62 and 63 will disengage from sections 71, 72 and 73 in the locking mechanism of the lower housing unit 2.

Figure 3:
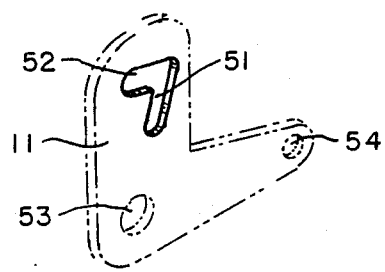
FIG. 3 is a perspective view of an alternative form of latch as utilized in the present invention.

An alternative version of latch 11 is shown in FIG. 3. This particular configuration of latch which includes an L-shaped slot consisting of an upper portion 51 and a base portion 52 will not in combination with the rest of the assembly act to trap or grab keys, it will however prevent movement of the locking bar initially. Thus, although in an attempted illegal entry the lock key can be freely rotated between unlocked and locked or home position, the locking bar movement will still be prevented by operation of latch 11 as shown in FIG. 3. It can be envisioned that the pin 17 which is attached to locking bar 12 would be trapped in the base leg 52 of the L-shaped slot in latch 11 as shown in FIG. 3. To unlock the latch, the special tool 31 would again be employed to engage the latch as in the above described arrangement, rotating it to the upper or horizontal leg section 51 of latch 11 as described in FIG. 3.

It can be seen from the foregoing that the included spring loaded latch 11, which contains either a T-shaped slot, as shown in FIG. 2, or an L-shaped slot as shown in FIG. 3 is utilized. Spring 22 provides the necessary force to insure latch position. Inclusion of special nut 21 provides the included arrangment as shown for mounting both latch 11 and spring 22 to stud 30 which exists normally on side 10 of the upper housing 1 as previously noted.

The special pin attached to the locking bar 12 replaces an existing torsion bar screw which normally is included in the paystation. with the special pin utilized to engage the latch 11 in either the L or T-shaped openings as previously noted.

Stud 30 as noted extends from the latch at right angles. Opening 32 allows access to the latch by special tool 31 for lower housing 2. This arrangement allows for mounting the latch to the left or right hand side of the upper housing depending on which side it is attached to on the latch. Tool 31 is used to push against stud 30 through opening 31 in the vault rim of the lower housing as no other pressure applied to this latch facilitates rotation of the latch to the unlatched position.

Of major significance in the present invention is the inclusion of the T-shaped slot that in the key grabber version which engages a pin 17 attached to locking bar 12. The slot as shown permits partial movement of the locking bar before activating and then prevents further return movement. Thus, the lock bolt is trapped by the locking bar preventing return to the home position and the upper housing key cannot be removed. In the alternative version of the latch shown in FIG. 3 an L-shaped slot prevents locking bar motion initially but otherwise operates in much the same manner as the T-shaped slot version of the latch shown in FIG. 2. The version shown in FIG. 3 as noted previously does not utilize an arrangement which entraps keys.

While but two embodiments of the present invention have been shown, it will be obvious to those skilled in the art that numerous modifications can be made without departing from the spirit of the present invention which shall be limited only by the scope of the claims appended hereto.

What is claimed is:

1. A security arrangement for a telephone paystation upper housing, including a cylinder lock, a locking bar engageable by said lock, a torsion bar, and latch means secured to said locking bar and to said torsion bar, said latch means comprising:
   a latch plate, including a first opening;
   said latch plate further including a second opening, including at least two communicating areas angularly related to each other;
   a bearing plate;
   a first projection extending from said bearing plate through said first opening facilitating rotational motion of said latch plate around said first projection from said bearing plate;
   and a projection from said locking bar normally extending through a first one of said communicating areas in said latch plate and in response to vertical movement of said locking bar resulting from engagement by said cylinder lock, said locking bar projection moved into a second one of said communicating areas whereby said locking bar is inhibited from further vertical embodiment.

2. A security arrangement for a telephone paystation upper housing as claimed in claim 1 wherein:
   there is further included a stud attached to said latch plate at right angles thereto;
   and a torsion spring engaging said bearing plate and said stud operating to retain said latch plate in a normal position.

3. A security arrangement for a telephone paystation upper housing as claimed in claim 2 wherein:
   there is further included an opening extending into said upper housing;
   and a tool insertable through said opening whereby in response to manual pressure by means of said tool through said opening said stud is operated to reposition said latch plate to prevent said locking bar from being inhibited for further vertical movement.

4. A security arrangement for a telephone paystation upper housing as claimed in claim 1 wherein:
   said latch plate second opening is T-shaped.

5. A security arrangement for a telephone paystation upper housing as claimed in claim 1 wherein:
   said latch plate second opening is L-shaped.

6. A security arrangement for a telephone paystation upper housing as claimed in claim 1 wherein:
   there is further included a torsion bar bracket mounting plate affixed to said upper housing and a torsion bar mounting bracket attached to said torsion bar mounting plate, supporting said torsion bar while permitting rotation of said torsion bar.

7. A security arrangement for a telephone paystation upper housing as claimed in claim 1 wherein:
   said cylinder lock includes a cam and a bolt portion affixed to said cam normally supporting said locking bar in an upward position.

8. A security arrangement for a telephone paystation upper housing as claimed in claim 7 wherein:
   said cylinder lock in response to operation, operates said locking bar to move downward in a vertical direction and said projection from said locking bar is moved from said first one to said communicating areas to said second one of said communicating areas.

* * * * *